United States Patent
Nazem et al.

(10) Patent No.: US 7,171,414 B1
(45) Date of Patent: Jan. 30, 2007

(54) DYNAMIC PAGE GENERATOR

(75) Inventors: Farzad Nazem, Redwood City, CA (US); Ashvinkumar P Patel, Milpitas, CA (US)

(73) Assignee: Yahoo, Inc., Santa Clara, CA (US)

( * ) Notice: Subject to any disclaimer, the term of this patent is extended or adjusted under 35 U.S.C. 154(b) by 0 days.

(21) Appl. No.: 09/393,718

(22) Filed: Sep. 10, 1999

Related U.S. Application Data

(63) Continuation of application No. 08/873,975, filed on Jun. 12, 1997, now Pat. No. 5,983,227.

(51) Int. Cl.
  G06F 7/00 (2006.01)
  G06F 17/30 (2006.01)
  G06F 17/00 (2006.01)

(52) U.S. Cl. ............................. 707/10; 707/3; 707/100

(58) Field of Classification Search ................. 705/10, 705/26; 707/102, 10, 100, 3
  See application file for complete search history.

(56) References Cited

U.S. PATENT DOCUMENTS

| | | | | |
|---|---|---|---|---|
| 5,546,455 A | * | 8/1996 | Joyce et al. | 379/265.03 |
| 5,754,938 A | | 5/1998 | Herz et al. | |
| 5,754,939 A | | 5/1998 | Herz et al. | |
| 5,761,662 A | | 6/1998 | Dasan | |
| 5,793,497 A | | 8/1998 | Funk | |

(Continued)

FOREIGN PATENT DOCUMENTS

EP  0749081 A1  12/1996

(Continued)

OTHER PUBLICATIONS

Garris, John, "Grab That Database", PC Magazine, vol. 15, No. 15, p. NE1 (Sep. 10, 1996).

(Continued)

*Primary Examiner*—Jeffrey Gaffin
*Assistant Examiner*—Cindy Nguyen
(74) *Attorney, Agent, or Firm*—Morrison & Foerster LLP

(57) ABSTRACT

An custom page server is provided with user preferences organized into templates stored in compact data structures and the live data used to fill the templates stored local to the page server which is handing user requests for custom pages. One process is executed on the page server for every request. The process is provided a user template is either generated from user preferences or retrieved from a cache of recently used user templates. Each user process is provided access to a large region of shared memory which contains all of the live data needed to fill any user template. Typically, the pages served are news pages, giving the user a custom selection of stock quotes, news headlines, sports scores, weather, and the like. With the live data stored in a local, shared memory, any custom page can be built within the page server, eliminating the need to make requests from other servers for portions of the live data. While the shared memory might include RAM (random access memory) and disk storage, in many computer systems, it is faster to store all the live data in RAM.

23 Claims, 7 Drawing Sheets

U.S. PATENT DOCUMENTS

| | | | |
|---|---|---|---|
| 5,793,972 A | | 8/1998 | Shane |
| 5,835,087 A | | 11/1998 | Herz et al. |
| 5,835,712 A | * | 11/1998 | DuFresne .................. 709/203 |
| 5,848,396 A | * | 12/1998 | Gerace ........................ 705/10 |
| 5,867,665 A | * | 2/1999 | Butman et al. ............. 709/239 |
| 5,897,622 A | * | 4/1999 | Blinn et al. .................... 705/26 |
| 5,913,029 A | * | 6/1999 | Shostak ...................... 709/203 |
| 5,918,214 A | * | 6/1999 | Perkowski .................... 705/27 |
| 5,933,599 A | * | 8/1999 | Nolan ........................ 715/734 |
| 6,026,433 A | * | 2/2000 | D'Arlach et al. ........... 709/217 |
| 6,226,654 B1 | * | 5/2001 | Van Hoff ................. 715/501.1 |
| 6,338,085 B1 | * | 1/2002 | Ramaswamy ............... 709/217 |
| 6,412,008 B1 | * | 6/2002 | Fields et al. ................. 709/228 |
| 2001/0047373 A1 | * | 11/2001 | Jones et al. ................. 707/515 |

FOREIGN PATENT DOCUMENTS

WO    WO 97/17662    5/1997

OTHER PUBLICATIONS

Chesnais et al., "The Fishwrap Personalized News System", IEEE, D-7803-27560X/95, pp. 275-282 (Jun. 1995).

Quintana, Yuri, "Knowledge-Based Information Filtering of Financial Information", XP-002057953, pp. 279-285 (May 1997).

* cited by examiner

```
<html>
<head>
<title>My Yahoo! news summary for <!-- login --></title>
</head>
<body>

<center>
<!--banner:sum -->

<!-- ad -->
<!-- nav_bar -->   ~ 302
</center>

<table border=1 cellpadding=4 cellspacing=0 width=100%">
<tr><td align=center valign=top width="1%">
<!-- leftside:nsum -->   ~ 302

<p></td>
<td align=center valign=top width="100%">
<!-- mode bar:"FRONT_PAGE" -->
<!-- channel:nsum -->   ~ 302

</td></tr>
</table>

<center>
<table border=1 cellpadding=2 cellspacing=0 width=100%">
<!-- motd:motn.html -->
</table>
</center>
<!-- search -->

<!-- copyright:sum -->

</body>
</html>
```

*FIG. 3.*

```
<!-- timezone:-8,PT 0 -->
<!-- ad:M,85,95035,T,* 792 -->
<!-- portfolio:Quotes,pf_1,1,^DJI,^NYA,^IXIC,^SPX,^XAX,YHOO,NSCP,IOM,NSCP,YHOO
2836 -->
<!-- scoreboard:NCAAFSSC,NHLSAN,MLSSAN,NCAAFSSS,ALOAK,NBAGSW,NFLOAK,NCAAFCCD,NFLSFO
,NLSFO 3803 -->
<!-- weather:f,30901,uk_londo,94601,95101 4368 -->
<!-- mode_bar:"FRONT_PAGE",.hier=News+Summary%3aEdit&.done=http://my.yahoo.com/news
/summary2:3,rt,rw,z0000,mlb,re,vf 4597 -->
<!-- motd:us_motn.html 4696 -->
<html>
<head>
<title>My Yahoo! news summary for ash802</title>
</head>
<body>
...
</body>
</html>
```

*FIG. 4.*

MY NEWS  MY  MY CONTACTS
         WEB

My Yahoo!
NEWS

HELP  PREFER-  MY AGENT
      ENCES

[SEARCH] OPTIONS

SECTIONS: FRONT PAGE | BUSINESS | PORTFOLIOS | ENTERTAINMENT | SPORTS | TECHNOLOGY

[MOVE TO BOTTOM]

| PORTFOLIOS | | [EDIT] |
|---|---|---|
| QUOTES | | |
| DJIA | 7312.15 | +22.75 |
| NYSE | 442.36 | +0.82 |
| NASDAQ | 1384.91 | -19.88 |
| S&P 500 | 845.48 | -0.88 |
| AMEX | 609.02 | +1.85 |
| * YHOO | 32 1/2 | -5/8 |
| * NSCP | 29 1/4 | -5/8 |
| * IOM | 19 1/4 | +1/2 |
| * NSCP | 29 1/4 | -5/8 |
| * YAHOO | 32 1/4 | -5/8 |

[GET QUOTES]

QUOTES DELAYED 20 MINUTES-DISCLAIMER
CLICK ON SYMBOL FOR DETAILED QUOTE +
NEWS. *NEW NEWS DURING LAST 24 HRS.

| FRONT PAGE JUN 3 7:40 PM | [EDIT TOPICS] |
|---|---|
| BREAKING NEWS *JUN 3 5:03 PM* | |
| · JUDGE MOVES TO AVOID McVEIGH 'LYNCHING' · McVEIGHS EXPECTED APPEALS MAY LAST YEARS · EXPERTS: PLEA FOR MERCY IS McVEIGH'S BEST HOPE | |
| WORLD *JUN 3 2:09 PM* | |
| · CANADIAN LIBERALS FACE THORNY ISSUES · U.S. ADVOCATES READY FOR NATO EXPANSION FIGHT · U.S. FERRIES MORE FOREIGNERS FROM SIERRA LEONE | |
| U.S. STOCK NEWS AND REPORT | |
| · CARDIMA INC IPO RANGE REDUCED - UNDERWRITER · AMEX TO TRADE LEUCADIA, WEST TELESERVICES OPTIONS · CBOE TO TRADE OPTIONS ON ALBERTO-CULVER CLASS A | |

SCOREBOARD
TODAY

*FIG. 5A.*

| AL | DETROIT | 8 F |
| | OAKLAND | 9 F |
| NL | SAN FRANCISCO | - F |
| | FLORIDA | |
| YESTERDAY | | |
| AL | DETROIT | 8 F |
| | OAKLAND | 7 F |
| NL | SAN FRANCISCO | 2 F |
| | FLORIDA | 4 F |

WEATHER [EDIT]

| AUGUSTA, GA | 63...78 F |
| LONDON, UK | 50...73 F |
| OAKLAND, CA | 59...70 F |
| SAN JOSE, CA | 54...75 F |

CLICK ON CITY FOR EXTENDED FORECAST

⎫
⎬ 504
⎭

MAJOR LEAGUE BASEBALL  *JUN 3  5:15PM*
- 1997 BASEBALL FREE AGENT DRAFT FIRST ROUND SELECTIONS
- MIKE PIAZZA LEADS BALLOTING IN NL ALL-STAR VOTING
- NATIONAL LEAGUE ALL-STAR VOTING RESULTS

ENTERTAINMENT TOP STORIES  *JUN 3  6:35PM*
- CLINTON REFLECTS ON MUSIC
- GIFFORD: MARRIAGE IS SOLID
- ROCKABILITY LEGEND HOSPITALIZED
  506  510

MOVIES + FILM  *JUN 3  10:13AM*
- FEATURE: NICOLAS CAGE ASKS, WHERE ARE THE HEROES?
- NICK CASSAVETES UPDATES FATHER'S 'BOOKIE'
- 'LOST WORLD' PROPS UP SLOW BOX OFFICE

504

TIP CLICKING ON THE MY YAHOO! LOGO AT THE TOP WILL RELOAD AND UPDATE YOUR DEFAULT PAGE.

YAHOO! BACK WEB CHANNEL GUIDE
YAHOO! COMMUNITY RELATIONS
GET LOCAL · NEWS TICKER · MOTLEY FOOL

GO TO YAHOO!

CHANGE USER

*FIG. 5B.*

| FIG. 5A. |
| FIG. 5B. |

*FIG. 5.*

DYNAMIC PAGE GENERATOR

This application is a continuation of application No. 08/873,975 filed on Jun. 12, 1997 now U.S. Pat. No. 5,983,227 and is incorporated herein by reference for all purposes.

COMPUTER PROGRAM LISTING APPENDIX

This application contains one compact disc, which includes computer program listings entitled "Appendix A. Listing of a User Template" and "Appendix B Listing of a User Page", created on Jan. 28, 2003, with a size of 116k bytes, which are both incorporated herein by reference in their entirety.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of customized information presentation. More specifically, one embodiment of the invention provides a custom page server which can quickly serve custom pages and is scalable to handle many users simultaneously.

Web servers for serving static documents ("Web pages") over the global Internet are known. While static documents are useful in many applications where the information to be presented to each requesting user is the same, some applications require customization to appeal to users. For example, in presenting news to users, custom pages present news which is more relevant to the requesting users than static pages. With static pages, a user will often have to scroll through many topics not of interest to that user to get to the information of interest. With custom pages, the information is filtered according to each user's interest.

Customizing a server response based on the requestor is known, however known systems do not scale well. One method of serving custom pages is to execute a script, such as a CGI (Common Gateway Interface) script, or other program to collect the information necessary to generate the custom page. For example, if the custom page is a news page containing stock quotes, sports scores and weather, the script might poll a quote server to obtain the quotes of interest, poll a sports score server to obtain the scores of interest and poll a weather server to obtain the weather. With this information, the server generates the custom page and returns it to the user. This approach is useful where there are not many requestors and where the attendant delay is acceptable to users. While it may be the case that current users are willing to wait while pages load in their browsers, growing impatience with waiting will turn users away from such servers, especially as use increases.

One approach to avoiding long waits is to transfer the custom information in non-real-time, so that the information is stored local to the user as it arrives and is presented to the user on request. A disadvantage of such a system is that the networks used by the user become clogged with data continually streaming to the user and require large amounts of local storage. Another disadvantage is that the locally stored information will become out of date as the server receives new data.

From the above it is seen that an improved system for delivering custom pages is needed.

SUMMARY OF THE INVENTION

An improved custom page server is provided by virtue of the present invention. In one embodiment, user preferences are organized into templates stored in compact data structures and the live data used to fill the templates is stored local to the page server which is handling user requests for custom pages. One process is executed on the page server for every request. The process is provided a user template for the user making the request, where the user template is either generated from user preferences or retrieved from a cache of recently used user templates. Each user process is provided access to a large region of shared memory which contains all of the live data needed to fill any user template. Typically, the pages served are news pages, giving the user a custom selection of stock quotes, news headlines, sports scores, weather, and the like. With the live data stored in a local, shared memory, any custom page can be built within the page server, eliminating the need to make requests from other servers for portions of the live data. While the shared memory might include RAM (random access memory) and disk storage, in many computer systems, it is faster to store all the live data in RAM.

If the volume of requests becomes too great for one page server to handle, the system is easily scaled by adding additional page servers. Each page server maintains its own copy of the live data in its shared memory, and needs to maintain only the user templates for the requests it is handling, so no communication between page servers is needed.

A further understanding of the nature and advantages of the inventions herein may be realized by reference to the remaining portions of the specification and the attached drawings.

BRIEF DESCRIPTION OF THE DRAWINGS

FIG. 3 is an illustration of a global front page template as might be used to generate user templates.

FIG. 4 is an illustration of a user template generated from the global front page template of FIG. 3 as might be used to generate a custom user page.

FIG. 5 is an illustration of a user page generated using the global template of FIG. 4.

Two appendices are included at the end of this description. Appendix A is a full listing of the user template shown in part in FIG. 4. Appendix B is an HTML source code listing of the HTML page used to generate the browser display shown in FIG. 5.

DESCRIPTION OF THE PREFERRED EMBODIMENTS

Figure 1:
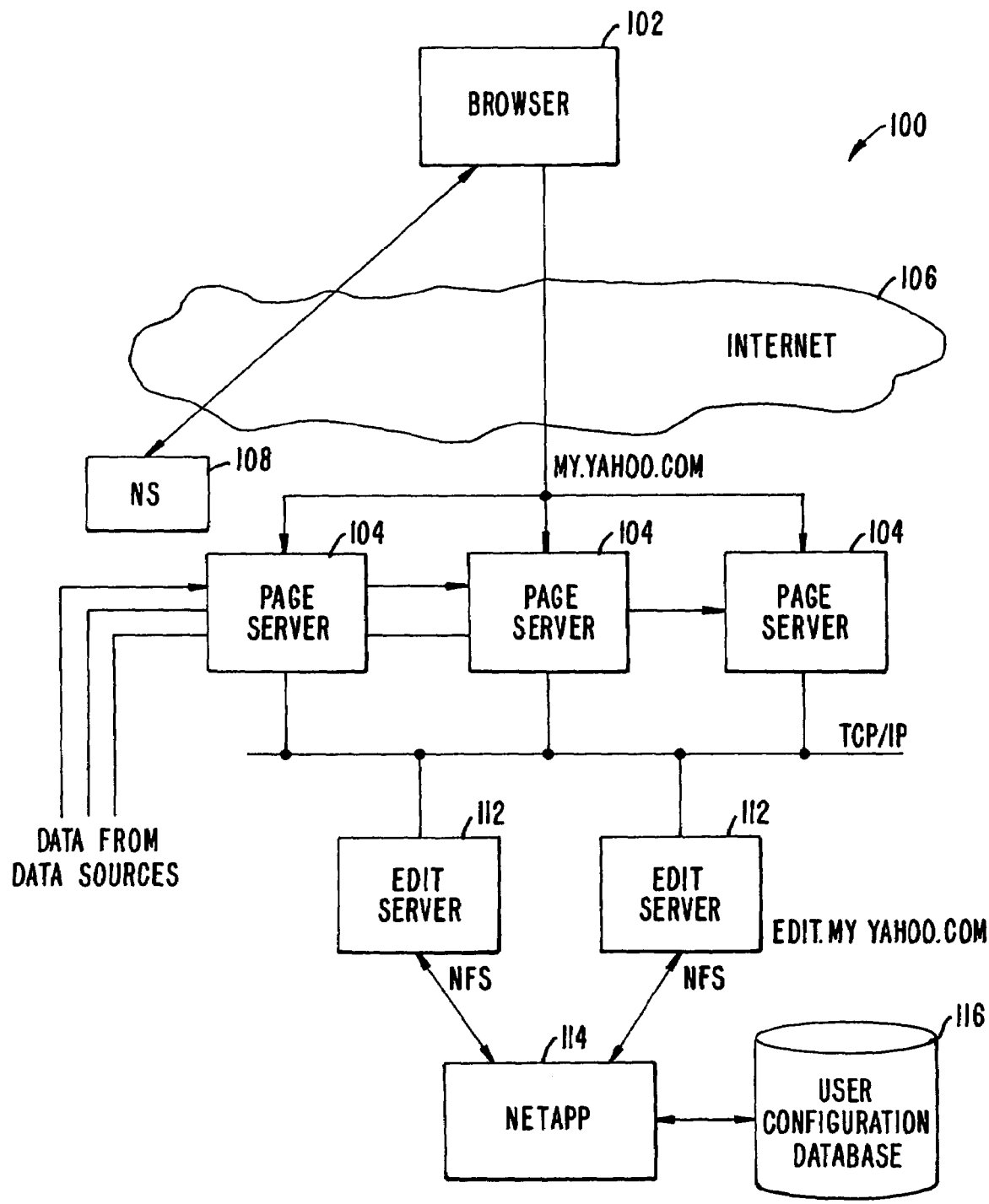
FIG. 1 is a block diagram of a client-server architecture according to one embodiment of the present invention.

FIG. 1 shows a client-server system 100 which is used to display custom news pages. A custom news page is displayed on a browser 102 which obtains the page from a page server 104 via Internet 106. While only one browser 102 is shown, a typical system will have many browsers connecting and disconnecting to the system.

The art of client-server systems using HTTP (HyperText Transport Protocol) messaging or other protocols is well known and will not be addressed in detail here. Essentially, browser 102 makes a request for a particular page by specifying a Uniform Resource Locator ("URL") for the page. In the example shown in FIG. 1, the request is directed to the URL "http:/my.yahoo.com/". Normally, this URL is directed to the root directory of a machine named my.yahoo.com. As is the convention in Internet communications, browser 102 submits the domain portion ("my.yahoo.com") of the URL to a name server, such as name server 108, to determine an actual address for the page server 104. Name server 108 returns an IP (Internet Protocol) address to browser 102 directing it to a page server 104. Where multiple page servers 104 are used, name server 108 returns IP addresses in a round-robin fashion to distribute the load over multiple page servers. Alternatively, name server 108 might distribute the load more deterministic by tracking browser addresses and hashing the browser address to select a page server 104. It is deterministic in that any given browser always accesses the same page server 104. This allows for more efficient caching of user templates, since more cache hits are likely where a given browser always returns to one page server.

When a page server receives the URL for its root directory, it interprets that as a request for the user's custom summary page. The user is determined not from the URL, but from a "cookie" provided by browser 102 with the URL. Cookies are strings of data stored by browsers and sent along with any request to a URL having a domain associated with the cookie.

Page servers 104 obtain the live data from many disparate sources and reformat the data into a form suitable for use by the page server. Page servers 104 are coupled, via a network, to edit servers 112, which are used when a user changes his or her user template. The user templates are stored in a user configuration database 116 and are stored and provided to edit servers by a network appliance 114 written for this purpose. Network appliance 114 is a process tuned to quickly locate files in large directories (N400 files/directory) and return them to the edit servers or page servers. One embodiment of network appliance 114 is the F330 fault-tolerant scalable server supplied by Network Appliance, of Mountain View, Calif.

In a specific embodiment, page servers 104 are microcomputers running the Unix® operating system with 64 to 128 megabytes of shared memory, page servers 104 and edit servers 112 are coupled using TCP/IP (Transport Control Protocol/Internet Protocol) and the user configuration database 116 is a Unix file structure which stores each user configuration in a text file. The particular file used by a user is a combination of the user's user name and a hash result, to allow for quick access when many user configurations are stored. For example, the user configuration for summary "front" page for a user "ash802" might be stored at /de/13/y.ash802, where "de" and "13" are hash results of a hash of the user name "ash802".

Figure 2:
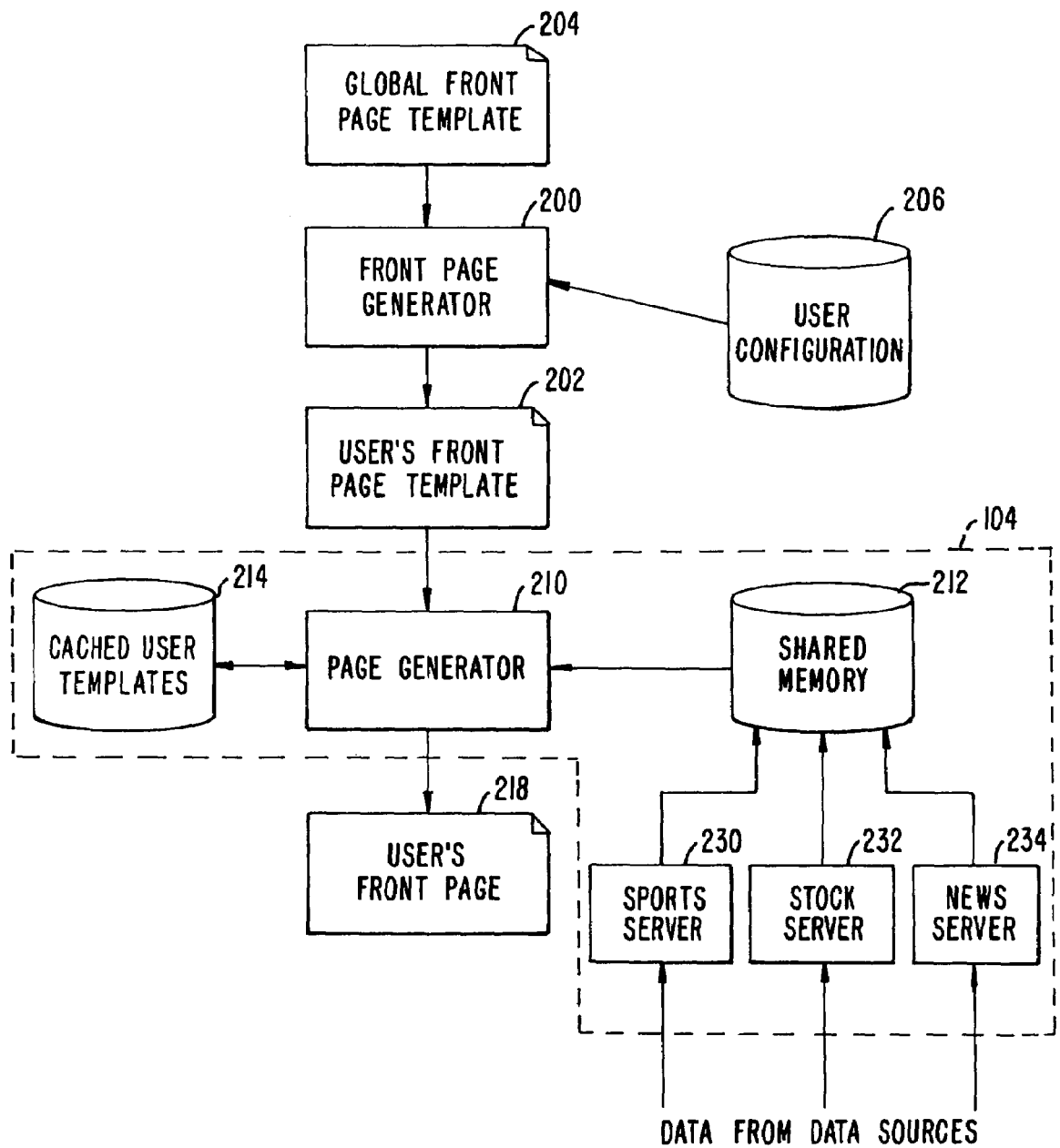
FIG. 2 is a schematic diagram showing how a user's custom page is generated from a user configuration, a global template and live data.

FIG. 2 shows in more detail the generation of a custom page for a user, using a front page generator 200 and page server 104. Front page generator 200 generates a user template 202 from a global front page template 204 and a user configuration record 206. FIG. 3 shows an example of a global front page template. User configuration record 206 is a record selected from user configuration database 116. The record might have been obtained from a cache, but in the preferred embodiment, the records are not cached, the user templates are.

Page server 104 is shown comprising a page generator 210, a shared memory 212 for storing live data and a cache 214 for caching user templates such as user template 202. Page generator 210 generates a custom front page 218 from a user template and the live data stored in shared memory 212. Although not shown, custom pages other than the front page can be generated in a similar fashion. Using user templates and a shared memory for the live data, page server 104 can quickly build custom pages in response to a user request. Where the user template is cached, the page can be generated entirely within page server 104.

Shared memory 212 is organized as a set of memory mapped files. With memory mapped files, the operating system maintains the data in permanent storage, but permanently caches the files in shared memory 212. This allows for quick recovery should a page server crash, since all of the shared memory can simply be reloaded from the permanent storage. This is a great feature from a user convenience standpoint, since the user will never be faced with a situation where they have to wait for a server to rebuild a page for them by querying the various data providing servers, such as sports server 230, stock server 232 and news server 234. As should be apparent from this description and FIG. 2, page generator 210 can generate custom front page 218 much more quickly using shared memory 212 as compared with using servers 230, 232, 234 and page template 202. One reason for this is that the time it takes to retrieve data from shared memory 212 does not appreciably increase relative to the bandwidth delay time when more data is retrieved. For example, if stock server 232 were queried for each individual stock quote, a page with fifty stock quotes might take ten times as long to generate as a page with five stock quotes.

One aspect of the present invention is the realization that every piece of information a person can request on a page is storable in a shared memory closely coupled to a page generator. For example, page server 104 shown in FIG. 2 can accommodate 65,000 different symbols for which quotes are provided. In one embodiment, all of the stock information for all 65,000 symbols is stored in a 13 to 14 megabytes section of the shared memory. Where shared memory 212 is a 64 MB or 128 MB memory, this leaves sufficient room for other data, such as news headlines, sport scores, and memory used by the operating system for each process running on page server 104. In some embodiments, shared memory 212 is large enough to also accommodate more than just news headlines. For example, news summaries (as described further in connection with FIG. 5) can be stored in shared memory 212 for quick access.

As shown in FIG. 2, the user's front page template 202 does not need to be generated each time, but rather is stored in cache 214. In a preferred embodiment, user templates are stored in cache 214 for long enough to be reused. Some users might choose to access their front page only infrequently, while others might choose to access their front page hourly. Since the pages are customized and dynamic, the user would see different information each time, but the same user template would be used each time. Of course, when the user edits his or her template, any cached copy of a user template is flushed. A garbage-collection process may also flush the cache of user pages which have been inactive for several days. In one implementation, cache 214 would accommodate 60,000 to 70,000 user templates. Where a particular page server is assigned on a random round robin basis, multiple page servers may cache their own copy of a given user template, but where a user is directed always to a particular server (except in the case where the particular server fails and a secondary server is used), that page server will be the only one which needs to cache that users user template. Even where the round robin name server scheme is used, some browsers may cache IP addresses, even longer than the specified "time to live" variable associated with the IP address, in order to save the time required to obtain an IP address each time. With such a browser, the user is effectively directed to the same page server each time and the server side of the page serving system does not need to direct users to particular page servers. With newer browsers, however, the "time to live" variable is honored and new requests are made for IP addresses after the "time to live" has expired. In these cases, if the assignment of a user to a single page server is desired, name server 108 (see FIG. 1) will use the user name from the provided cookie or the user's IP address to assign a page server based on a hash of the user name or IP address.

FIG. 3 is an illustration of global user template 204. Global user template 204 is an HTML (HyperText Markup Language) document with additional tags as placeholders for live data. Several placeholders 302 are shown in FIG. 3.

FIG. 4 is an illustration of user template 202 as might be generated from global user template 204 (see FIG. 3) and a user configuration record 206. A full listing of user template 202 is included herewith in Appendix A. User template 202 is determined by the user configuration and is independent of the live data, therefore it can be cached without needing to be updated, unless the user chooses to edit the configuration information. Preferably, the user templates are cached rather than the user configuration, to save a step and reduce the time to respond to a request for the page. Caching is more effective where the typical user makes several requests in a short time span and then doesn't make any requests for a long period of time.

Essentially, user template 202 contains the information about the user which does not change until the user changes his or her preferences. Of course, the system operator could choose to make changes to how the system operates, thus requiring changes to the user preferences and user templates. User template 202 is shown comprising internal variables such as a time zone and demographic information. The demographic information, on the second line in FIG. 4 is used for selection of an advertisement which will be part of the custom page. In this example, the advertisement is targeted by the demographic information in the user template ":M, 85, 95035, T, *" indicating that a suitable ad should be targeted to a male user, age 85, located in zip code 95035, etc. As shown, the portfolio section contains selected stock symbols, the scoreboard section contains selected team symbols, and the weather section contains selected weather cities/zip codes.

The selections of stock quote symbols, team scores, and weather cities are set by the user. In a preferred embodiment, intelligent defaults are selected by the system prior to user selection, so that users unfamiliar with the customization process will nonetheless be able to view non empty custom pages. This is described in further detail below in connection with FIG. 6.

FIG. 5 is an illustration of a user front page 218 returned by page server 104. User front page 218 as shown in FIG. 5 includes many elements, some of which are described here in further detail. User front page 218 is built according to a user template and live data. The user template specifies, for example which quotes are shown in the portfolio module, which cities are displayed in the weather module, etc. Each of the modules 504 can be customized by a user and moved about front page 218. The modules 504 are also reusable, in that any customized module which appears on multiple pages can be edited from any one of those pages and the edits will be reflected on each of the pages. Other custom pages for the user can be viewed by selecting one of the page buttons 502 appearing below the header. Other pages and utilities can be selected using the buttons 508 which are part of the header.

In addition to all of the live date shown in FIG. 5 being stored in the shared memory, summaries from each of the major news topics can also be stored in the shared memory and viewed by pressing on the news topic header, such as news topic header 506. As should be noted, the page generator can also intelligently display dates 510 customized for a particular user, using a time zone variable in the user template. This time zone variable is shown as the first line in user template 202 in FIG. 4. In addition to being able to modify each of the modules, in many cases the order of appearance of the modules is customizable. For example, the order of the various sections of user template 202 shown in FIG. 4 is not fixed.

The preference editing process can be initiated by the user pressing the appropriate edit button 512. As explained above, once the editing process is complete, the user template is flushed from the cache and regenerated. Since each of the news stories is essentially a static page linked to a headline shown in the news section, these can simply be linked to static pages on a news server.

Figure 6:
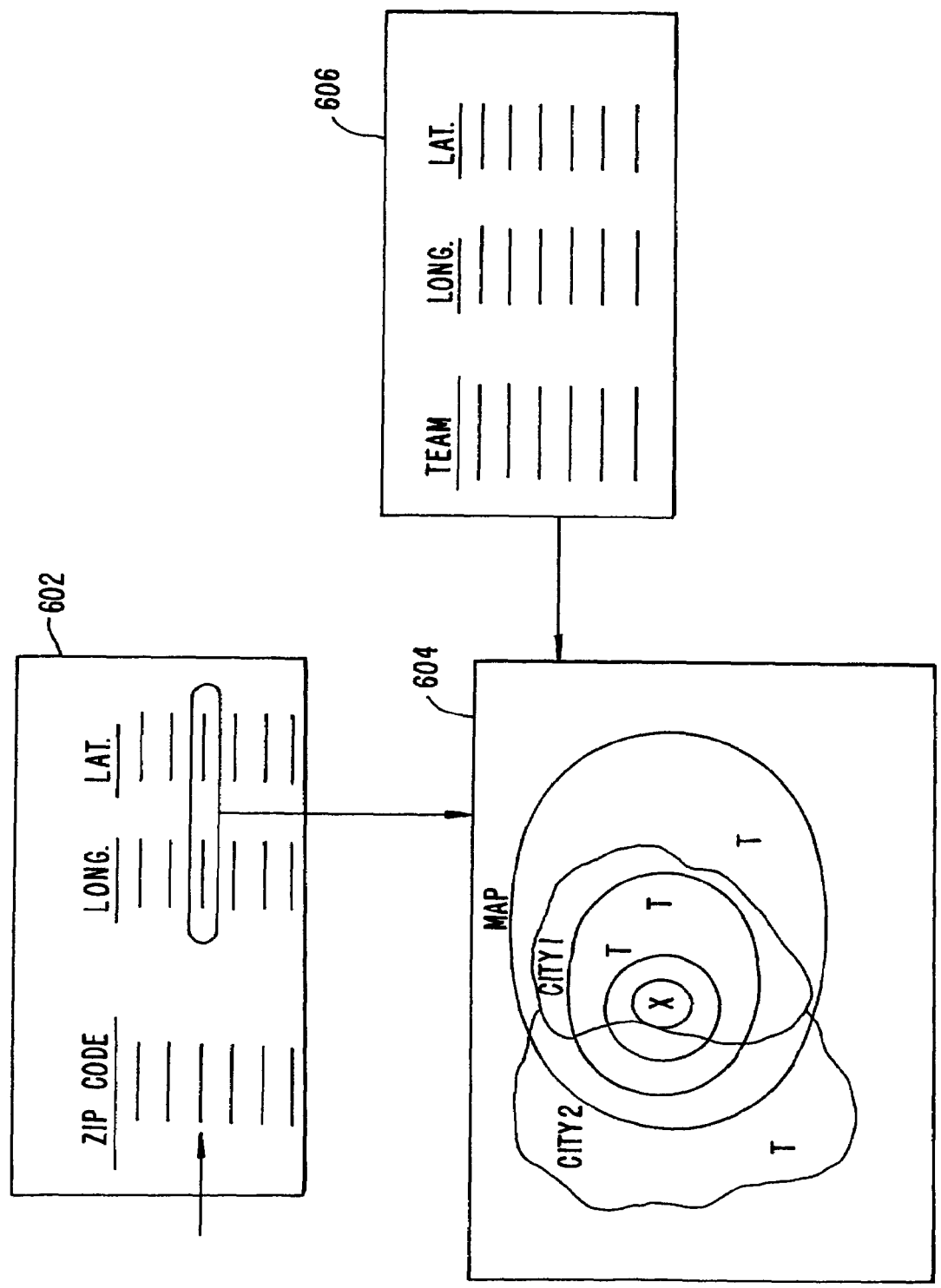
FIG. 6 is an illustration of how intelligent defaults are selected.

Referring now to FIG. 6, an illustration of intelligent defaulting for populating a user template, and consequently a user summary page. As part of a registration process, a user indicates, among other things, his or her zip code. This zip code is used to locate an approximate longitude and latitude for the user using a zip code lookup table 602. This allows the user's location to be located on a map 604. Map 604 provides city boundaries and, with team location table 606, also provides locations for various sports teams which can be selected in a sports module. In selecting a default predetermined number of cities and sports teams for inclusion as initial selections for a particular user, a circle is drawn around the user and increased in diameter until the circle envelopes a suitable predetermined number of cities and sports teams. In this way, each user is guaranteed a default number of nearby teams and cities for sports and weather, respectively. While this assumes that the user is interested in only the teams nearest the user, the system can be arranged to provide intelligent defaults where geographic anomalies are known to exist. Geographic anomalies occur in communities which have more loyalty to distant teams than nearby teams, such as might occur when the distant team is much better than the nearby team or when the nearby team recently moved to a distant location. In any case, the user is allowed customize his or her pages beginning with the intelligent defaults selected.

Other intelligent defaults can be provided in other contexts. For example, the header of user front page 218 includes a button 508 labelled "myweb" which, when pressed, would lead the user to a custom listing of web sites. The initial defaults for that custom listing of web sites might be generated based on the keywords of interest to that user or based on the news topics, sports teams or weather cities selected by the user.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. In a page server coupled to a network, a method of providing a customized page to a user, wherein the customized page is customized according to the user's preferences, the method comprising:

obtaining real-time information from information sources;

storing the real-time information in a shared local storage device;

storing a user-specific template program for the user in a data structure associated with a user identifier unique to the user;

receiving, from the user and at the page server, a user request for a customized page;

determining a user identifier associated with the request;

receiving a template program specific to the user using the determined user identifier associated with the user request, wherein the template program is received from one of at least two locations, the location determined from frequency of the user request for the customized page;

executing the template program specific to the user using the real-time information stored in the shared local storage device to generate the customized page, wherein the template program indicates items of interest to the user; and providing the user with the customized page.

2. The method of claim 1, further comprising, prior to receiving the user request, caching the template program in a storage location local to the page server.

3. The method of claim 1, further comprising receiving user preferences for the user, wherein the user preferences indicate the items of interest to the user, and combining the user preferences with a generic template to form the template program specific to the user.

4. The method of claim 3, further comprising providing the template program specific to the user to the page server.

5. The method of claim 3, wherein the page server performs the combining of the user preferences with the generic template.

6. The method of claim 1, wherein the real-time information comprises stock quotes, sports scores and news headlines.

7. The method of claim 1, further comprising generating a default user configuration for the user based on demographic information of the user.

8. The method of claim 7, wherein generating a default user configuration comprises:

determining a default list of cities for a weather report based on user demographic information; and determining one or more sports teams for sports reporting based on user demographic information.

9. The method of claim 7, wherein determining a user identifier comprises:

obtaining user postal code information;

translating the postal code information to user geographic position;

comparing the user geographic position to geographic positions assigned to each city and sports team; and determining a threshold distance from the user geographic position which is greater than or equal to a distance to a predetermined nonzero number of cities and a predetermined nonzero number of sports team geographic positions.

10. Using a page server, a method of providing real-time responses to user requests from a plurality of users for customized pages, the method comprising:

obtaining user preferences for the plurality of users, wherein a user's user preferences indicate items of interest to that user;

obtaining real-time information from information sources;

storing the real-time information in a shared local storage device;

for each of the plurality of users, combining the user preferences for a specific user and a template to form a template program specific to the user;

storing user-specific template programs for each of the plurality of users in a data structure associated with user identifiers;

receiving, from a user at the page server, a user request for a customized page;

determining a user identifier associated with the user request;

receiving a template program specific to the user using the determined user identifier associated with the user request, wherein the template program is received from one of at least two locations, the location determined from frequency of the user request for the customized page;

executing the template program specific to the user using the real-time information stored in the shared local storage device to generate the customized page at the page server according to the user preferences; and providing the user with the customized page, wherein the steps of executing and providing are performed in real-time response to receipt of the user request in the step of receiving, wherein the customized page includes at least one item of real-time information selected from the shared local storage device.

11. In a page server coupled to a network, a method of providing customized pages to a plurality of users, wherein a customized page for a user is customized according to the user's preferences, the method comprising:

obtaining real-time information from information sources;

storing the real-time information in a shared local storage device;

storing user-specific template programs for each of the plurality of users in a data structure associated with user identifiers;

receiving, at the page server, requests for a customized page from the plurality of users, wherein a first request is received from a first user in the plurality of users and a second request is received from a second user;

determining a first user identifier associated with the first request;

determining a second user identifier associated with the second request;

receiving a first template program specific to the first user using the determined first user identifier for the first user, wherein the first template program is received from one of at least two locations, the location determined from frequency of the first user request for the first customized page;

receiving a second template program specific to the second user using the determined second user identifier for the second user, wherein the second template program is received from one of at least two locations, the location determined from frequency of the second user request for the second customized page;

executing the first template program specific to the first user and the second template program specific to the second user using the real-time information stored in the shared local storage device as input to the first and second template programs to generate the first customized page for the first user and the second customized page for the second user, wherein the first template program uses data associated with the first user and the second user template uses data associated with the second user; and providing the first user with the first customized page and the second user with the second customized page, wherein the first and second customized page include at least one item of real-time information selected from the shared local storage device.

12. The method of claim 11, further comprising, prior to receiving the user requests, caching the first and second template programs in a storage location local to the page server.

13. The method of claim 11, further comprising receiving user preferences for the first and second users, wherein the user preferences indicate the items of interest to the first and second users, and combining the user preferences for the first user with a generic template to form the first template program specific to the first user and combining the user preferences for the second user with the generic template to form the second template program specific to the second user.

14. The method of claim 13, further comprising providing the first and second template programs to the page server.

15. The method of claim 13, wherein the page server performs combining of the user preferences with the generic template for the first and second users.

16. The method of claim 11, wherein the real-time information comprises stock quotes, sports scores and news headlines.

17. The method of claim 11, further comprising generating a default user configuration for the first and second users based on demographic information of the first and second users.

18. The method of claim 17, wherein generating a default user configuration comprises:

determining a default list of cities for a weather report based on user demographic information; and determining one or more sports teams for sports reporting based on user demographic information.

19. The method of claim 17, wherein determining a first user identifier and determining a second user identifier comprise:

obtaining user postal code information;

translating the postal code information to user geographic position;

comparing the user geographic position to geographic positions assigned to each city and sports team; and determining a threshold distance from the user geographic position which is greater than or equal to a distance to a predetermined nonzero number of cities and a predetermined nonzero number of sports team geographic positions.

20. The method of claim 1, wherein receiving the template program comprises receiving the template program from a local storage of cached user templates when the specific user request for the customized page is of a higher frequency.

21. The method of claim 1, wherein receiving the template program comprises remotely generating the template program for the user when the specific user request is of a lower frequency.

22. The method of claim 11, wherein receiving the template program comprises receiving the template program from a local storage of cached user templates when the frequency of specific user request for the customized page is high.

23. The method of claim 11, wherein receiving the template program comprises remotely generating the template program for the user when the frequency of specific user request for the customized page is low.

* * * * *